US005545049A

United States Patent [19]
Hasegawa et al.

[11] Patent Number: 5,545,049
[45] Date of Patent: Aug. 13, 1996

[54] CONNECTOR

[75] Inventors: Toshiaki Hasegawa; Satoki Masuda, both of Shizuoka, Japan

[73] Assignee: Yazaki Corporation, Tokyo, Japan

[21] Appl. No.: 359,422

[22] Filed: Dec. 20, 1994

[30] Foreign Application Priority Data

Dec. 28, 1993 [JP] Japan .................................. 5-337552

[51] Int. Cl.⁶ .................................................. H01R 13/62
[52] U.S. Cl. ............................ 9/310; 439/483; 439/476.1
[58] Field of Search .................................... 439/310, 259, 439/261, 372, 476, 483, 481

[56] References Cited

U.S. PATENT DOCUMENTS

| | | | |
|---|---|---|---|
| 5,344,331 | 9/1994 | Hoffman et al. | 439/310 X |
| 5,385,480 | 1/1995 | Hoffman et al. | 439/310 OR |
| 5,417,579 | 5/1995 | Yoshioka et al. | 439/310 OR |
| 5,429,524 | 7/1995 | Wakata et al. | 439/310 OR |

FOREIGN PATENT DOCUMENTS

| | | |
|---|---|---|
| 2435705 | 4/1975 | Germany . |
| 60-24539 | 6/1985 | Japan . |
| 3-127784 | 12/1991 | Japan . |
| 4-87169 | 3/1992 | Japan . |

*Primary Examiner*—David L. Pirlot
*Assistant Examiner*—Daniel Wittels
*Attorney, Agent, or Firm*—Armstrong, Westerman, Hattori, McLeland & Naughton

[57] ABSTRACT

A connector of a type where a female connector and a male connector are fitted to each other wit ha small force through the use of a lever. An elongated hollow case houses a connector body slidable in an front half of the case. The connector body has a plurality of terminals therein. A handle is mounted to a rear half of the case and is adapted to advance and retract with the connector body longitudinally within the case. A lever has a acting portion and an operating portion and journaled at an intermediate portion thereof within the case. The acting portion is pivotally connected to the handle or the connector body. The operating portion projects outwardly of the case. Pivoting the lever about the intermediate portion journaled within the case causes the connector body to advance said connector body into a fitting engagement with an external mating connector body. The ever includes the operating portion integrally continuous with the acting portion, a handlebar pivotally connected to the operating portion, and a tension spring mounted between the handlebar so that the spring yieldably stretches if a force applied to the handlebar exceeds a predetermined value when the handlebar is operated.

2 Claims, 13 Drawing Sheets

CONNECTOR

BACKGROUND OF THE INVENTION

1. Field of the Invention

The present invention relates to an improved connector of a type where a female connector and a male connector are fitted into each other with a small force by the use of a lever.

2. Prior Art

FIGS. 15 and 16 illustrate a female connector and a male connector used for charging a battery of an electric car disclosed in Japanese Patent No. 60-24539. The connector includes a female connector (power-receiving connector) 61 fixed to the oar body and a male connector (power-supplying connector) 62 provided on the power-supplying apparatus. Upon fitting the cylindrical male connector 62 to the female connector 61, a pair of arms 67 engage engaging grooves 68 while the male terminal 63 is fitted into the female terminal 64. When an electric power is fed to the connectors, an electromagnet coil 65 is energized to descend a plunger to a position where the plunger 66 brings the arms 67 into a locking position. The female and male connectors cannot be disconnected from each other while power is being supplied. Upon completion of supplying power, the electromagnet coil 65 is deenergized to ascend a plunger 66 to a position where the plunger 66 can be pushed by hand so that the arms 67 are released from the annular fastening groove 68.

With the connector 62 of the above-described prior art connector, the arms, electromagnet coil 65, and plunger 66 are aligned on the axis where connectors A and B are fitted to each other. This arrangement is close to the path of a lead 71 of a cable 70. This leads to a large size and a complex interior construction of a connector, so that the connector cannot have as many terminals as are necessary for circuits for display, signals and control in addition to the power-supplying circuit.

Providing the connector with a multitude of terminals requires a large insertion force for fitting the female connector to the male connector making manual connection difficult. To overcome this deficiency, a variety of connectors have been proposed in Japanese Laid-open patent No. 4-87169 and Japanese Laid-open Utility model No. 3-127784. However, the force amplified by the lever may possibly damage the lever itself and the connector when the lever is operated if the female and male connectors are not properly fitted to each other.

SUMMARY OF THE INVENTION

An object of the invention is to provide a connector where the female and male connectors may be fitted with a small force. Another object of the invention is to provide a connector where the connector may be prevented from being damaged due to an excessive force when the lever is operated.

A connector according to the present invention is a connector of a type where a female connector and a male connector are fitted to each other wit ha small force through the use of a lever. An elongated hollow case houses a connector body slidable in an front half of the case. The connector body has a plurality of terminals therein. A handle is mounted to a rear half of the case and is adapted to advance and retract with the connector body longitudinally within the case. A lever has a acting portion and an operating portion and journaled at an intermediate portion thereof within the case. The acting portion is pivotally connected to the handle or the connector body. The operating portion projects outwardly of the case. Pivoting the lever about the intermediate portion journaled within the case causes the connector body to advance said connector body into a fitting engagement with an external mating connector body. The lever includes the operating portion integrally continuous with the acting portion, a handlebar pivotally connected to the operating portion, and a tension spring mounted between the handlebar so that the spring yieldably stretches if a force applied to the handlebar exceeds a predetermined value when the handlebar is operated.

BRIEF DESCRIPTION OF THE DRAWINGS

Features and other objects of the invention will become more apparent from the description of the preferred embodiments with reference to the accompanying drawings in which:

FIG. 10 illustrates an excessive load F1 acting on the straight tube 4a;

DETAILED DESCRIPTION OF THE PREFERRED EMBODIMENTS

Operation

Figure 1:
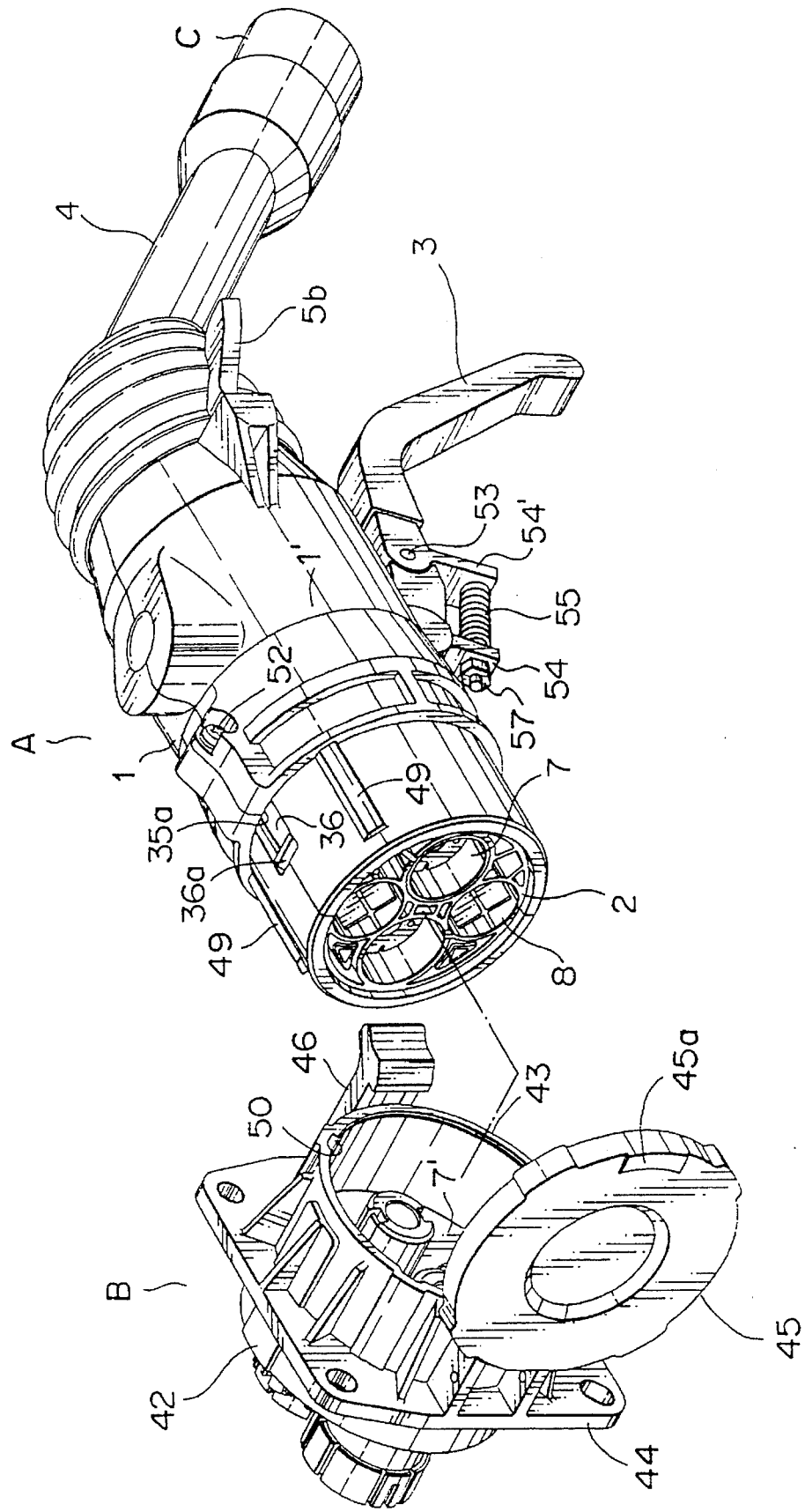
FIG. 1 is a perspective view of an embodiment showing a feeding side connecter and a receiving side connector when they are disconnected.

A force applied to the handlebar exceeding a predetermined value will cause excessive stresses to act on various structural elements of the power-supplying connector when the power-supplying connector is not use or not properly fitted into the mating connector. Such an excessive force applied to the handlebar causes the tension spring mounted between the handlebar and the operating portion to yieldably stretch, thereby preventing damages to the various parts of the connector.

Construction

Referring to FIGS. 1–5, a power-supplying connector A is mounted on a power supplying apparatus and a power-receiving connector B is mounted on a car body. The power-supplying connector A has a case made of two longitudinal halves 1 and 1' assembled together by means of a screw 52. A connector body 2 of connector A is generally cylindrical in shape and is slidably housed in the front half of the assembled case. The rear half of the case houses a handle 4 adapted to advance and retract longitudinally within the case. The handle 4 is moved forwardly by operating the lever 3 so as to move the connector body 2 towards the power-receiving connector B. The rear half houses an lever 5 that temporarily locks the lever 3 and an electromagnet coil 6 that permanently locks the lever 5. The rear end of the handle 4 receives a cable C extending from the power supplying apparatus.

Figure 2:
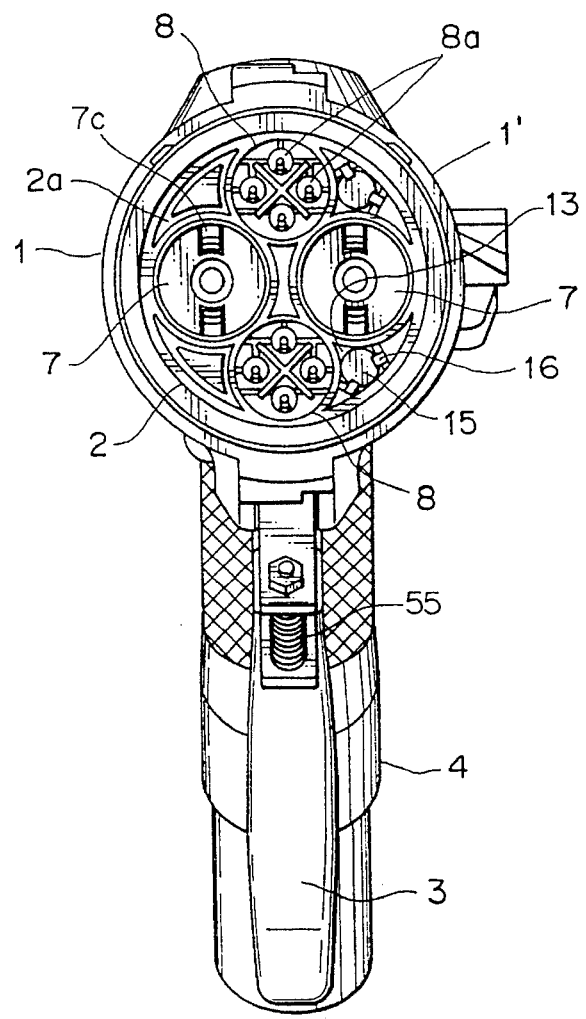
FIG. 2 is a front view of the power-supplying connector of FIG. 1.
Figure 3:
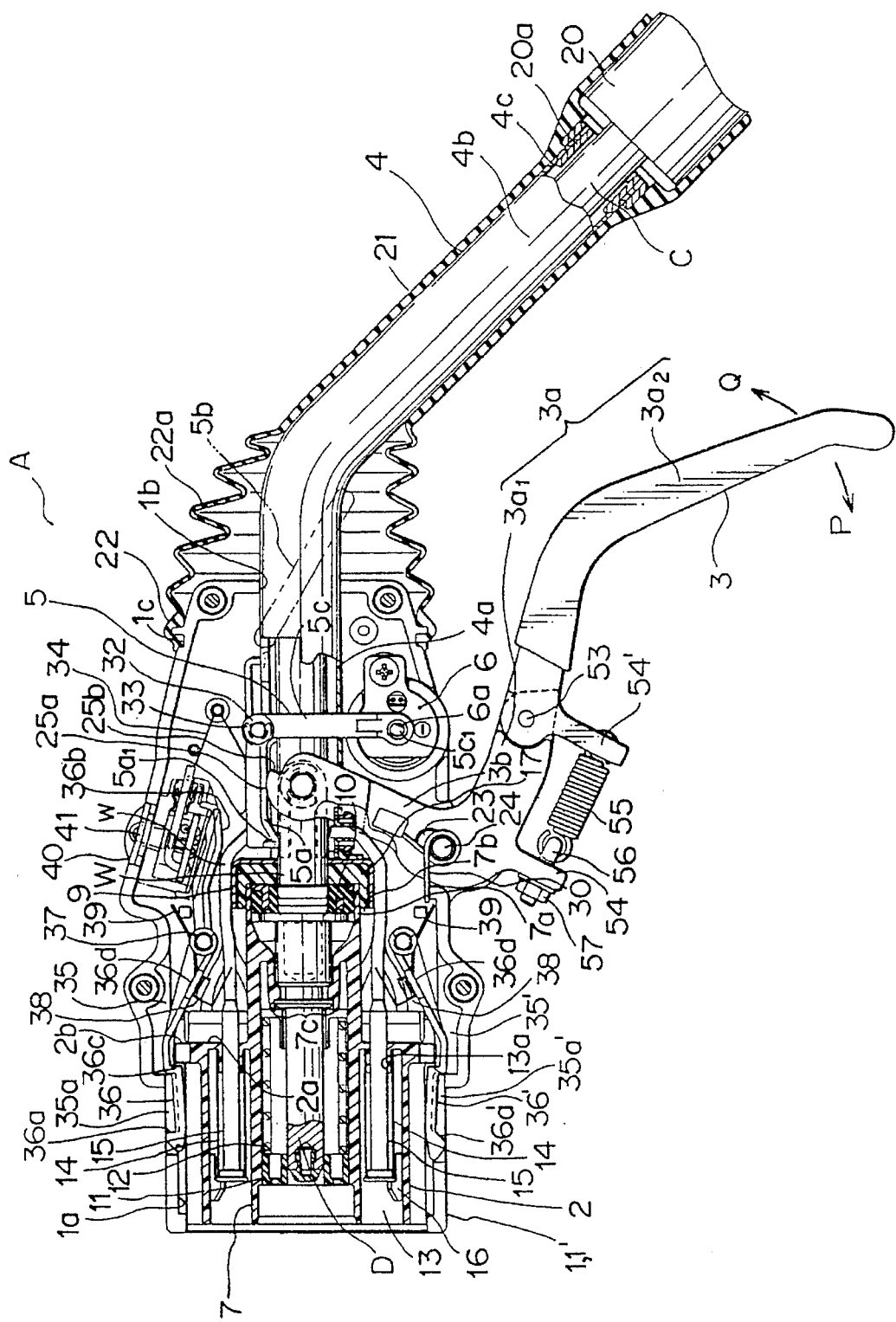
FIG. 3 is a longitudinal cross-sectional view of the power-supplying connector of FIG. 1.

As shown in FIG. 2, terminal chambers 7 and 7 of a large diameter rise from the bottom wall 2a axially of the case and are diametrically opposed on the left and right sides within the case. Likewise, composite-terminal chambers 8 and 8 rise from the bottom wall 2a and are diametrically opposed on the upper and lower walls of the case. The terminal chamber 7 has a wall 7a that rearwardly extends from the inner wall 2a as shown in FIG. 3, and a seat 7b provided on the outer circumference of the wall 7a. A pressing plate 9 provided in front of the handle 4, abuts the seat 7b. As shown in FIG. 2, a pair of flexible fastening arms 70 are diametrically provided in the terminal chambers 7 and hold male terminals D of the power-supplying side. Male terminals, not shown, to be connected to the control circuits for signaling and displaying are housed in four cavities 8a of the composite-terminal chamber 8. Wires W and leads w from the cable C are crimped to the male terminals D and terminals in the four cavities, respectively. Watertight rubber plugs 10 are pressed into the terminal chambers 7 and cavities 8a so as to effect watertight sealing for the respective terminal chambers as well as to prevent short-circuit between the respective terminals. An inner lid 11 is inserted axially into the forward end portion of the chamber 7. A coil spring 12 is inserted coaxially with the chamber 7 beside the inner lid 11. A flange 2b is provided on the outer circumference of the rear portion of the connector body 2, the flange being in slidable contact with the inner wall of the halves 1A and 1B. Pin chambers 13 and 13 are formed between the terminal chamber 7 and the complex terminal-chamber 8. A driven pin 15 extends into a guide hole 13a in slidable contact with the inner wall of the guide hole 13a and is urged by a coil spring 14 toward the forward end of the terminals chamber 7. A stopper 16 serves as a stopper for the driven pin 15. A rear holder 17 prevents the male terminal D from being pulled out rearwardly.

The handle 4 is generally of a kinked shape that includes a straight tube 4a at the front half portion and a beveled tube 4b at the rear half portion, and serves as a protector for the leads W and w of the cable C. The straight tube 4a is slidably supported in a hole 1b at the rear end of the case. The beveled tube 4b is formed with axially extending opposed holes 4c therein at the rear end portion into which arms 20a fits to firmly fasten a protective case 20 of the cable C to the beveled tube 4b. A grip 21 is made of a resilient material such as a synthetic rubber, and has bellows 22a at one end thereof with a watertight cap 22 formed at a tip end of the bellows. The cap 22 fits into an annular groove 1c provided at the rear end portion of the case.

The lever 3 is generally of an L-shape and includes a long handlebar 3a and a short acting portion 3b. The handlebar 3a includes a rod 3a1 formed integrally continuous with the acting portion 3b, and a hook 3a2 pivotally mounted to the rod 3a1 by means of a pin 53. The rod 3a1 and the hook 3a2 have a strap 54 and a strap 54' to which a hook 56 is screwed thereinto. A tension spring 55 is arrayed across the hook 56 and the strap 54'. The tension spring 55 is designed to begin to stretch when a tensile force of about 200N is applied thereto. The tension of the spring 55 is adjusted by means of an adjustment screw 57.

Figure 5:
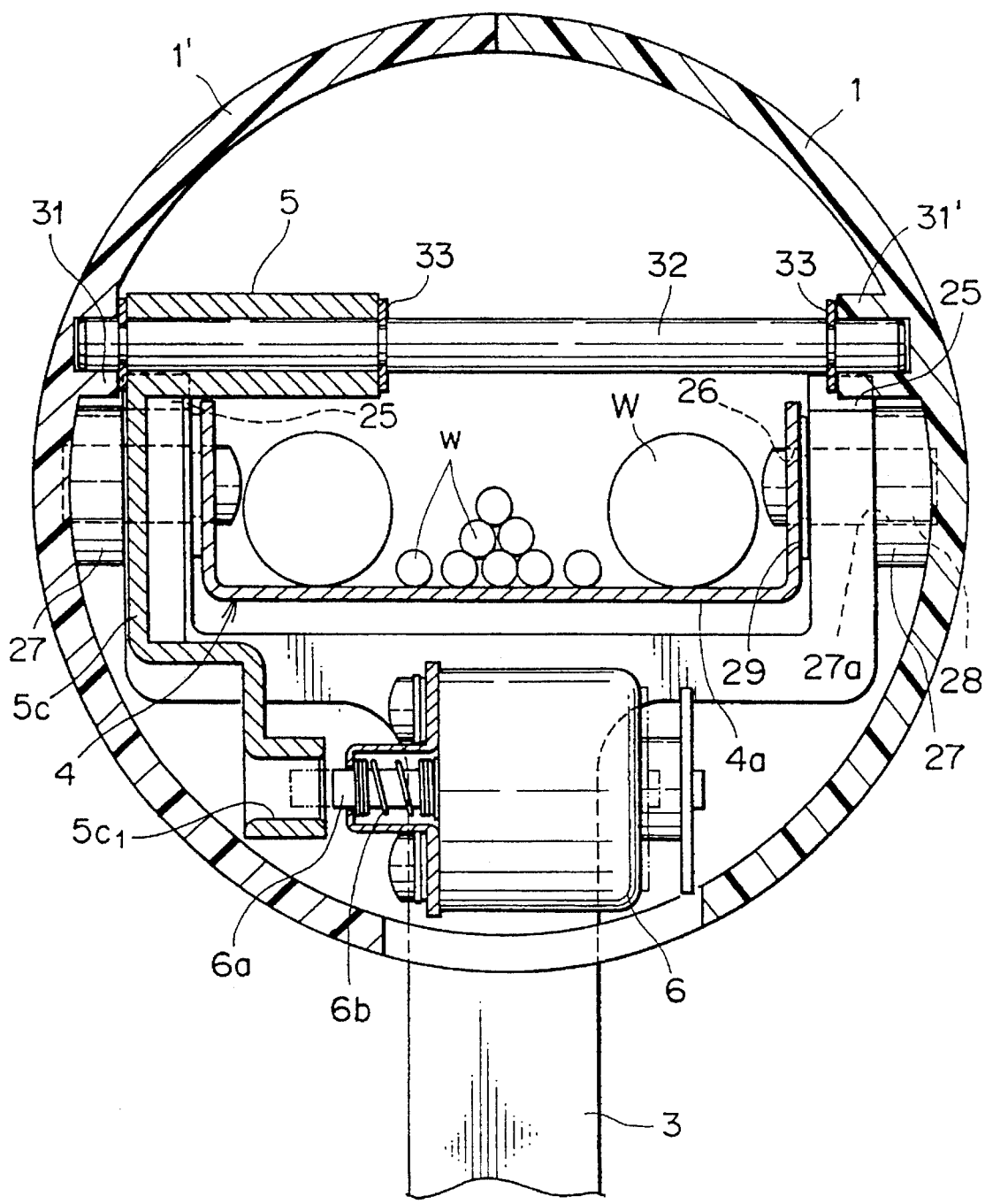
FIG. 5 is a cross-sectional view of an essential part of FIG. 3 showing mounting construction of the lever 3 and lever 5.

There is an elongated hole 23 at a portion where the acting portion 3b is continuous with the rod 3a1. The acting portion 3b is pivotally mounted to the case 1 (1') via a lever shaft 24. The acting portion 3b has a bifurcated supports 25 and 25 as shown in FIG. 5. The supports 25 are journaled on pins 28 and 28, each of which is inserted into a laterally extending hole in a boss 27 that inwardly projects from the inner wall of the case 1 (1') and into a hole 26 formed in the side wall of the straight tube 4a of the handle 4. The pins 28 are mounted with snap rings 29 thereon. The support 25 has an arcuate tip end 25a and is formed with an engagement step 25b at the tip end 25a. The engagement step 25b engages later described engagement projection 5a1 of the lever 5. A return spring 30 is mounted on the lever shaft 24 so as to bias the lever 3 in the direction of arrow P in FIG. 1. The lever 5 is generally of a T-shape in one piece construction, and includes an acting arm 5a that extends axially of the connector body 2, an operating arm 5b that projects outwardly of the case 1 (1'), and a locking arm 5c extending downwardly from where the arms 5a and 5b are jointed. As shown in FIG. 5, the arms 5a–5c are rotatably supported at an upper portion of the straight tube 4a by means of a snap pin 33 and a pin 32 mounted across bosses 31 and 31' on the inner wall of the case 1 (1'). The acting arm 5a is positioned so that the under surface of the acting arm 5a slidably contacts the arcuate portion 25a of lever 3. The acting arm 5a has a projection 5a1 at a tip end thereof which engages the engagement step 25b. The acting arm 5a is urged against the arcuate portion 25a by a coil spring 34 mounted to the inner wall of the case 1'. The locking arm 5c is formed with a locking hole 5c1 at a lower end thereof into which a plunger 6a driven by an electromagnet coil 6 is adapted to advance. The electromagnet coil 6 is fixed to the case 1'. The electromagnet coil 6 is energized upon completion of the fitting engagement of the power-supplying connector A into the power-receiving connector B, the plunger 6a advances into the locking hole 5c1 so that the lever 5 is locked. The electromagnet coil 6 is deenergized upon completion of charging the battery of the electric car, so that the plunger 6a is quickly retracted with the aid of the strong resilient force of the coil spring 6b, unlocking the lever 5.

Locking chambers 35 and 35' are formed to extend into the interior of the case 1 (1') in such a way that the locking chambers lie from the middle to the front half of the case. The looking chambers have openings 35a and 35a' that open to a forward end thereof. Looking arms 36 and 36' are to be looked to the power-receiving connector B. The looking arm 36 is journaled at an intermediate portion thereof on a pin 37 in the looking chamber 35. A hook 36a of the looking arm 36 extends to the outer periphery of the case 1 (1') through the openings 35a, while the acting piece 36b extends rearwardly to serve as an acting piece 36b for the acting portion 5a of the lever 5. Between the pin 37 and the hook 36a is provided with a stepped portion 36c stepped toward the exterior of the case and a strap 36d having a U-shaped cross section. The strap 36d opposes the connector body 2. A leaf spring 38 is mounted on the hook 36d which spring 38 faces the driven pin 15. The forward end of the other looking arm 36' extends to the exterior of the case 1 and has a so-called semi-lock type thick piece 36a', while the rear end is journaled to a pin 37 in the locking chamber 35'. The looking arm 36' is the same as the locking arm 36 except that the acting portion 36b is not provided. The looking arms 36 and 36' are urged inwardly of the case by the coil springs 39, respectively.

Figure 4:
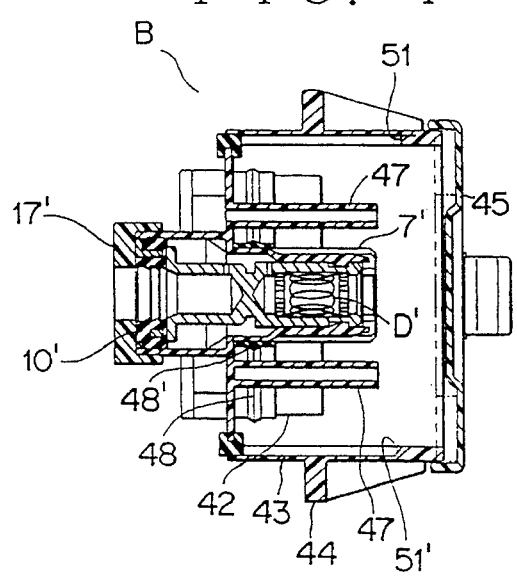
FIG. 4 is a longitudinal cross-sectional view of the power-receiving connector of FIG. 1.
Figure 6:
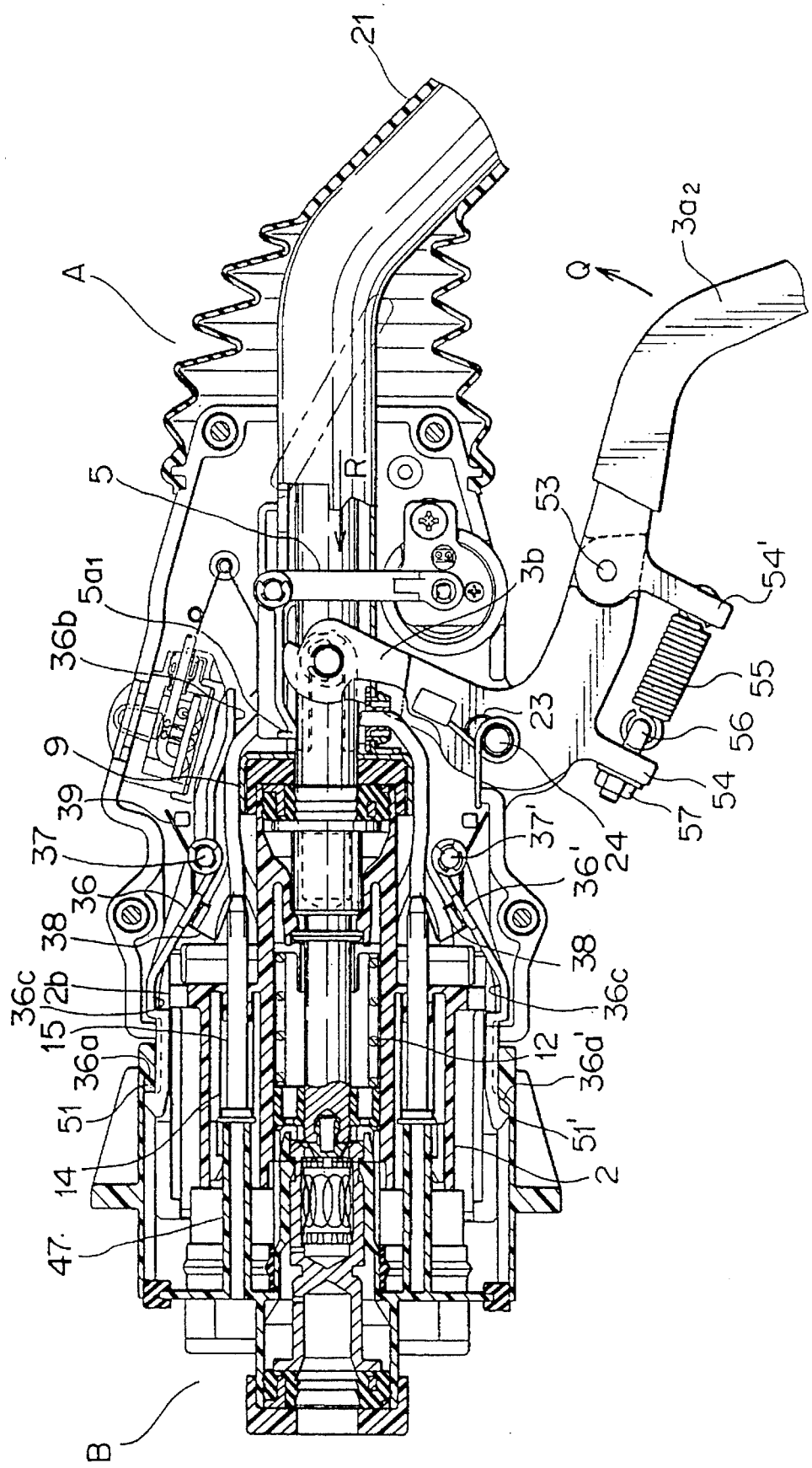
FIG. 6 is a longitudinal cross-sectional view of FIG. 1 showing the power-supplying connector temporarily fitted.
Figure 7:
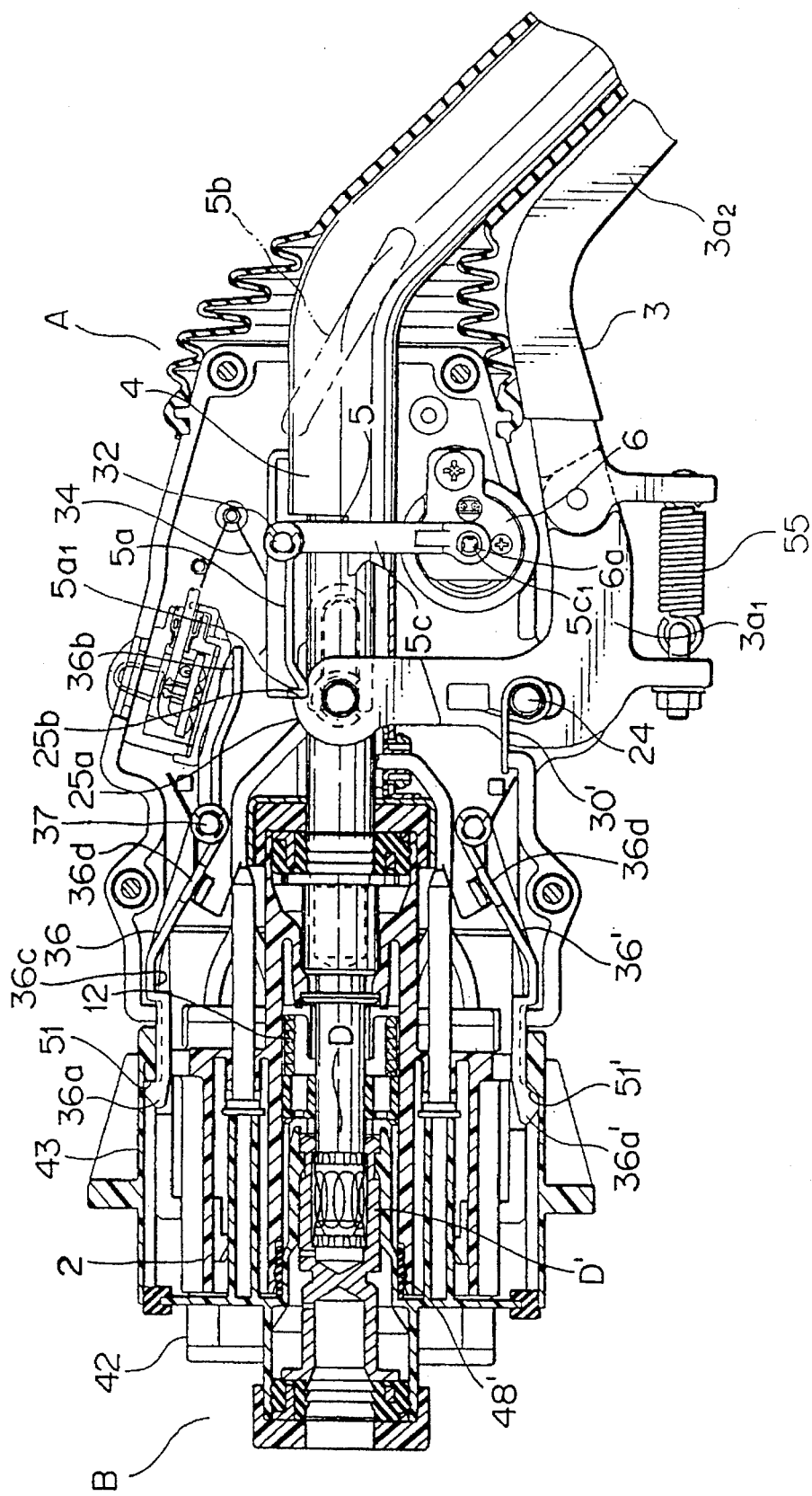
FIG. 7 is a longitudinal cross-sectional view of FIG. 6 showing the power-supplying connector completely fitted.

An LED chamber 40 integrally continuous with the case is formed behind the look chamber 35 to extend into the interior of the case. An LED 41 is mounted in the LED chamber to indicate that electric power is being fed. As shown in FIGS. 1 and 4, the power-receiving connector B includes a connector body 42 in which female terminals D' corresponding to the male terminals D of the power-supplying connector A are housed. A shell 43 is provided to encircle the connector body 42 in a sealing relation and receives the forward end portion of the power-supplying connector A. The shell 43 fixed to the car body by means of bolts (not shown) at a flange 44. As shown in FIG. 1, a cap 45 is pivotally mounted by means of a pin, not shown, to an opening end of the shell 43 so that the cap 45 is adapted to open and close the shell 43. The cap 45 is looked to the shell 43 upon the engagement of the fastening portion 45a with a looking arm 46. The connector body 42 is provided with drive bosses 47 that oppose the driven pins 15 and 15 of the power-supplying connector A (FIG. 6). A terminal cavities 7', watertight rubber plugs 10', and rear holders 17' are of similar construction to the power-supplying connector A, and the description thereof have been omitted. Watertight sealing packings are denoted at 48 and 48'. In order for the power-supplying connector A to accurately fit to the power-receiving connector B, the case 1 is provided with axial ribs 49 as shown in FIG. 1 and the shell 43 has guide grooves 50 in the inner circumferential surface into which the ribs 49 fit. Further, the power-receiving connector B is provided with stepped portions 51 and 51' into which the locking arms 36 and 36' of the power-supplying connector A engage to ensure accurate registration between the power-supplying connector A and the power-receiving connector B.

While the embodiment has been described with respect to the power-supplying connector A having the male terminals D and the power-receiving connector B having the female terminals D', the connector bodies 2 and 42 may also be designed so that the power-supplying connector A has the female terminals D' and the power-receiving connector B having the male terminals D.

When the power-supplying connector A is not in use, the flange 2b of the connector body 2 engages the stepped portion 36c of the locking arm, which are biased inwardly of the case by the coil spring 39. Thus, the connector body 2 is not able to advance and the lever 3 is not permitted to swing in the direction of arrow Q.

FIG. 6 illustrates the power-supplying connector A temporarily fitted to the power-receiving connector B. The case 1 (1') is inserted into the power-receiving connector B with the ribs 49 formed on the outer circumferential surface of the connector A, which are aligned in line with the guide grooves 50 in the inner circumferential surface of the shell 43. Then, the drive boss 47 of the connector B forces the driven pin 15 into the case 1 (1') against the urging force of coil spring 14. This causes the tip end portions of the locking arms 36 and 36' to rotate about the pins 37 and 37' allowing the hook 36a and semi-lock type hook 36a' to engage the stepped portions 51 and 51' of the shell 43 to temporarily lock the connectors A and B together.

Then, rotating the lever 3 in the direction of the arrow Q while gripping the handlebar 3a, causes the acting portion 3b to rotate about the lever shaft 24 so that the handle 4 advances in the direction of arrow R. Thus, the connector body 2 is advanced by means of the plate 9 against the strong resilient force of the coil spring 12 with the result that the connectors A and B are fully fitted and firmly locked with the female terminals D' connected to the male terminals D.

While the connectors A and B are moving from the temporary fitting state to the permanent fitting state, rotating the lever 3 causes the arcuate portion 25a in a slidable contact with the under surface of the acting portion 5a to push up the acting portion 5a against the urging force of the coil spring 34. When the arcuate portion 25a overcomes the projection 5a1 upon the full fitting of the connectors A and B, the acting arm 5a quickly returns to its home position by the urging force of the coil spring 34 so that the projection 5a1 engages the stepped portion 25b to bring the lever 3 into a temporarily locked relation with the lever 5.

Figure 8:
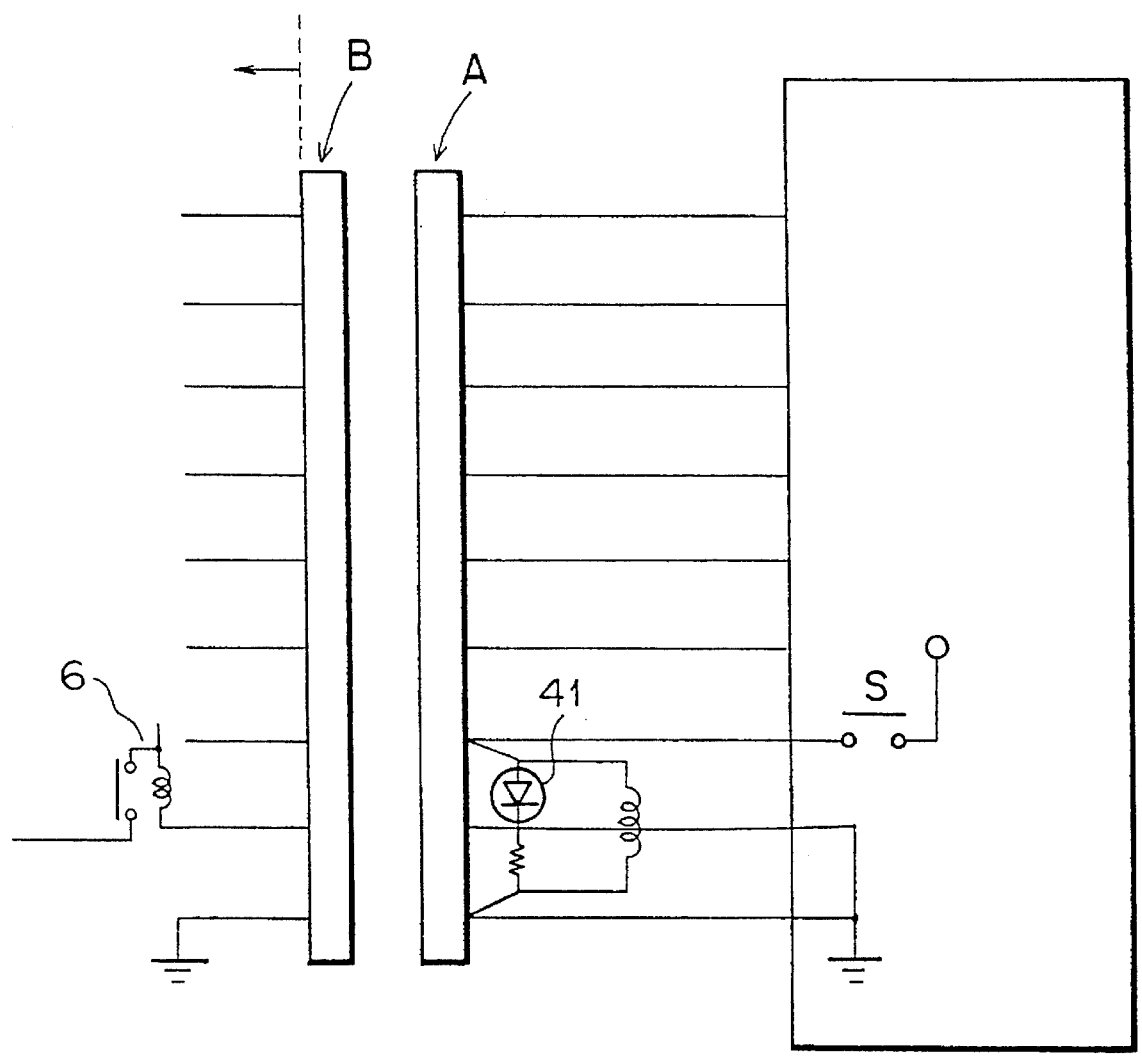
FIG. 8 is a schematic diagram of the power-supplying connector of FIG. 1.

With the connectors A and B fully fitted to each other, upon throwing a switch S into the ON position as shown in FIG. 8, the LED 41 comes on and the electromagnet coil 6 is energized so that the plunger 6a (FIG. 5) advances into the locking hole 5c1 in the locking arm 5c of the lever 5 to permanently lock the lever 5. Thus, the lever 3 is locked in a double way. Thus, if the operator inadvertently try to depress the operating arm 5b of the lever 5 during power-supplying operation, the plunger 6a will hold the lever locked to prevent the disconnection of the connectors A and B from each other.

The unlock and disconnection between the connectors A and B are performed in the following manner.

Upon completion of charging the battery of the car, the control circuit deenergizes the electromagnet coil 65 so that the plunger 6a quickly returns to its home position from the looking hole 5c1, thus unlocking the lever 5. Then, the operator depresses the operating arm 5b to bring the lever 5 out of engagement with the lever 3. Thus, the connector body 2 disconnects from the connector body 42 with the aid of the strong resilient force of the coil spring 12 and return spring 30 of the lever 3, while at the same time the lever 3 returns to its home position. Then, the operator further depresses the operating arm 5b, which pushes up the acting portion 38b of the locking arm 36. This causes the locking arm 36 to rotate counterclockwise about the pin 37 so that the hook 36a displaces downwardly disengaging from the stepped portion 51 in the inner circumferential surface of the shell 43. The hook 36a' of another locking arm 36' is of a semi-lock type and is easily unlocked from engagement with the stepped portion 51' by pulling the power-supplying connector A toward the operator.

After the lever 5 has been unlocked from the lever 3, the arcuate portion 25a of the lever 3 pivotally mounted on the handle 4 is still in contact with the operating arm 5a of the lever 5 even if the operator lets go of the lever 5. Retracting the handle 4 pushes up the acting portion 36b of the looking arm 36, permitting the unlocking operation of the connectors A and B. In this manner, locking and unlocking operations of the connectors A and B can be performed very easily by pushing or drawing the connector A into or from the connector B.

When connector housings are fully fitted to each other and the lever 3 is fully looked to the lever 5, the tip end portion of the power-supplying connector A fits into the shell 43 of the power-receiving connector B. The watertight packing 48 interposed between the case 1 (1') and the connector body 42 prevents water from entering the connector body 42. The watertight packing 48' between the terminal chambers 7 and 7' enhances watertight effect.

The plunger 6a of the electromagnet coil 6, which permanently looks the lever 5, is not in line with the lever shaft 24 of the lever 3. This prevents the direct application of a force to the plunger when the lever is rotated by mistake during looking operation, preventing damages to the connector A. The lever may be mounted directly to the connector body 2 in stead of mounting directly to the handle 4.

Figure 9:
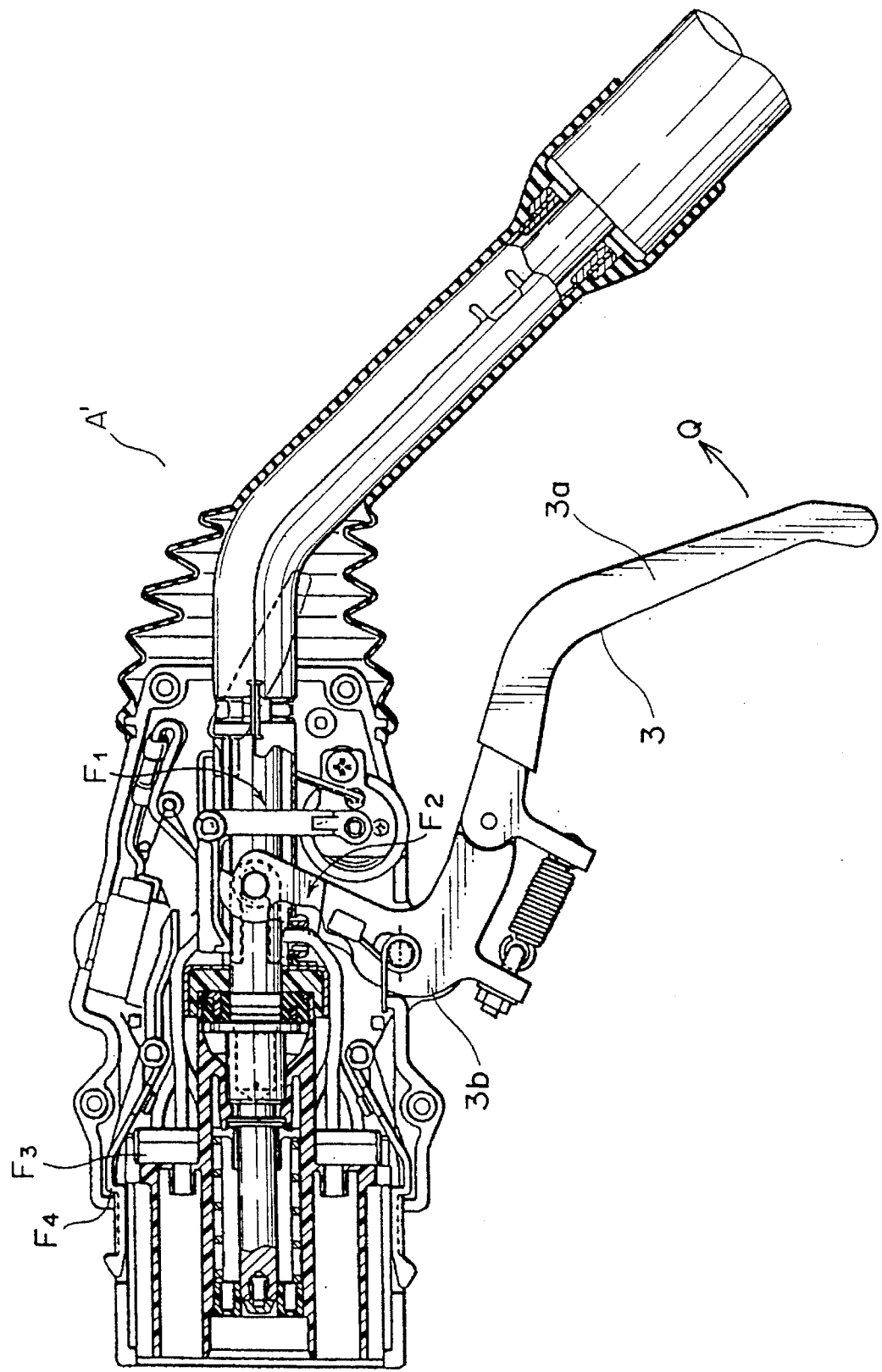
FIG. 9 illustrates a power-supplying connector showing forces acting on various parts of the power-supplying connector when in use.

FIG. 9 illustrates a power-supplying connector showing forces acting on various parts of the power-supplying connector. When the power-supplying connector A is not in use, the flange 2b of the connector body 2 engages the stepped portions 36c of the looking arms 36 and 36', which are biased by the coil springs 39. Thus, the main part 2 is not able to advance and the lever 3 is not permitted to swing in the direction of arrow Q. More firmly griping the lever 3 toward the handle 4 applies an excessive load to portions depicted at F1, F2, F3, and F4.

Figure 10:
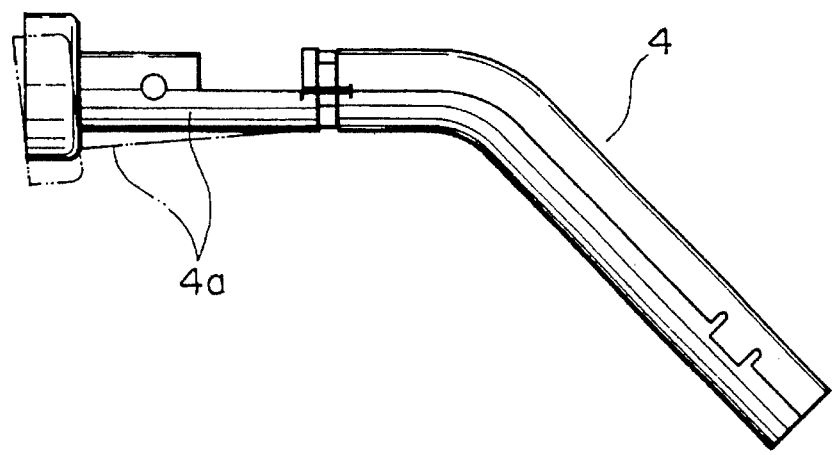

The excessive load F1 acting on the straight tube 4a tends to cause the straight tube 4a to deflect as depicted by a dash-dots line in FIG. 10.

Figure 11:
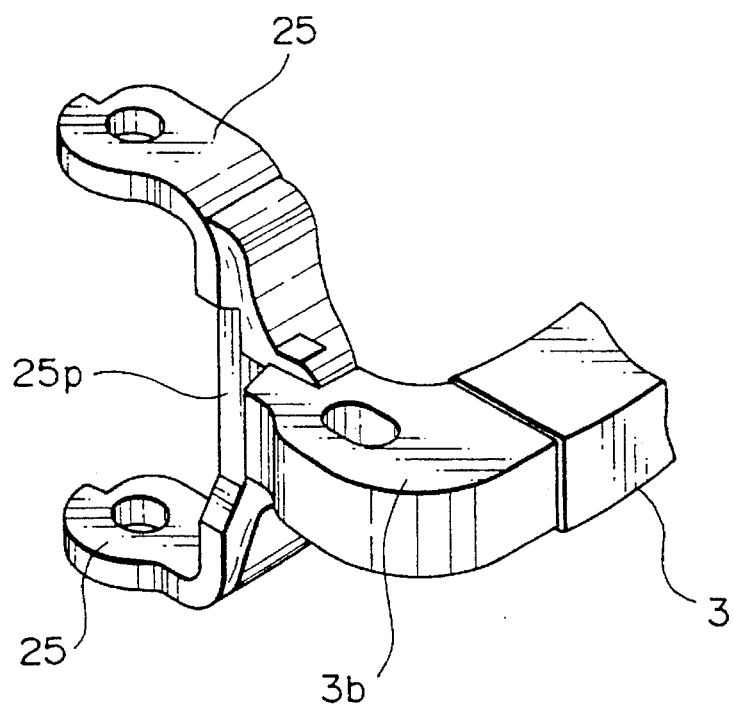
FIG. 11 illustrates an excessive load F2 acting on the base 25p of the bifurcated support 25 on top of the lever 3 that may result in damage to thereto.

The excessive load F2 acting on the base 25p of the bifurcated support 25 on top of the lever 3, as shown in FIG. 11, may result in damage to thereto.

Figure 12:
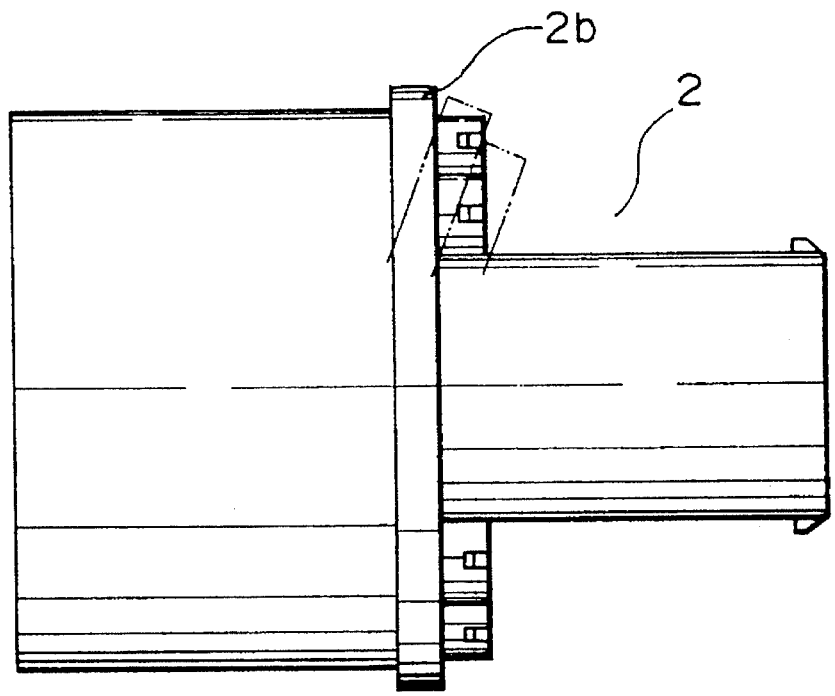
FIG. 12 illustrates an excessive load F3 acting on the flange 2b.

The excessive load F3 acting on the flange 2b tends to cause the flange 2b to deflect as shown in FIG. 12.

Figure 13:
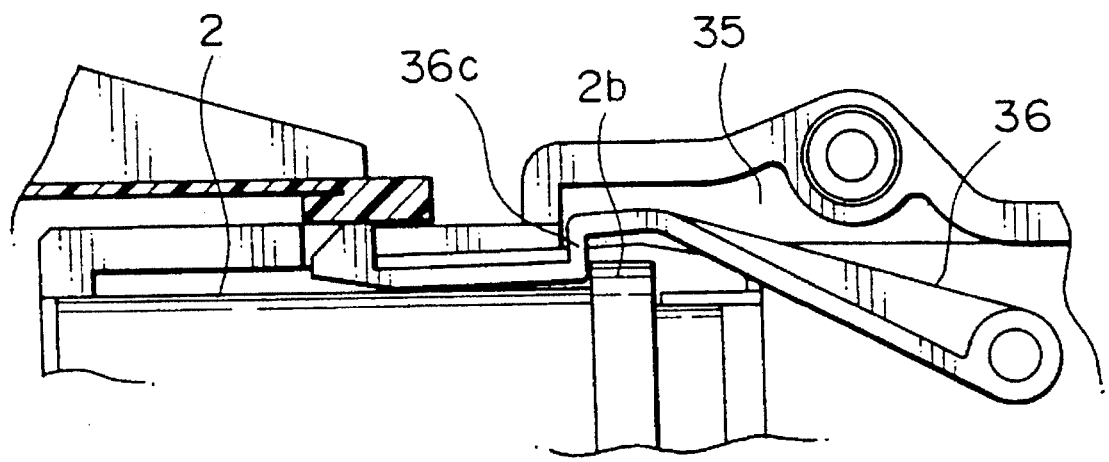
FIG. 13 illustrates an excessive load F4 acting on the stepped portion 36c of the locking arm 36 sandwiched between the flange 3b and the locking chamber 35.

The excessive load F4 acting on the stepped portion 36c of the locking arm 36 sandwiched between the flange 2b and the locking chamber 35, tends to break the stepped portion 36c in FIG. 13.

Figure 14:
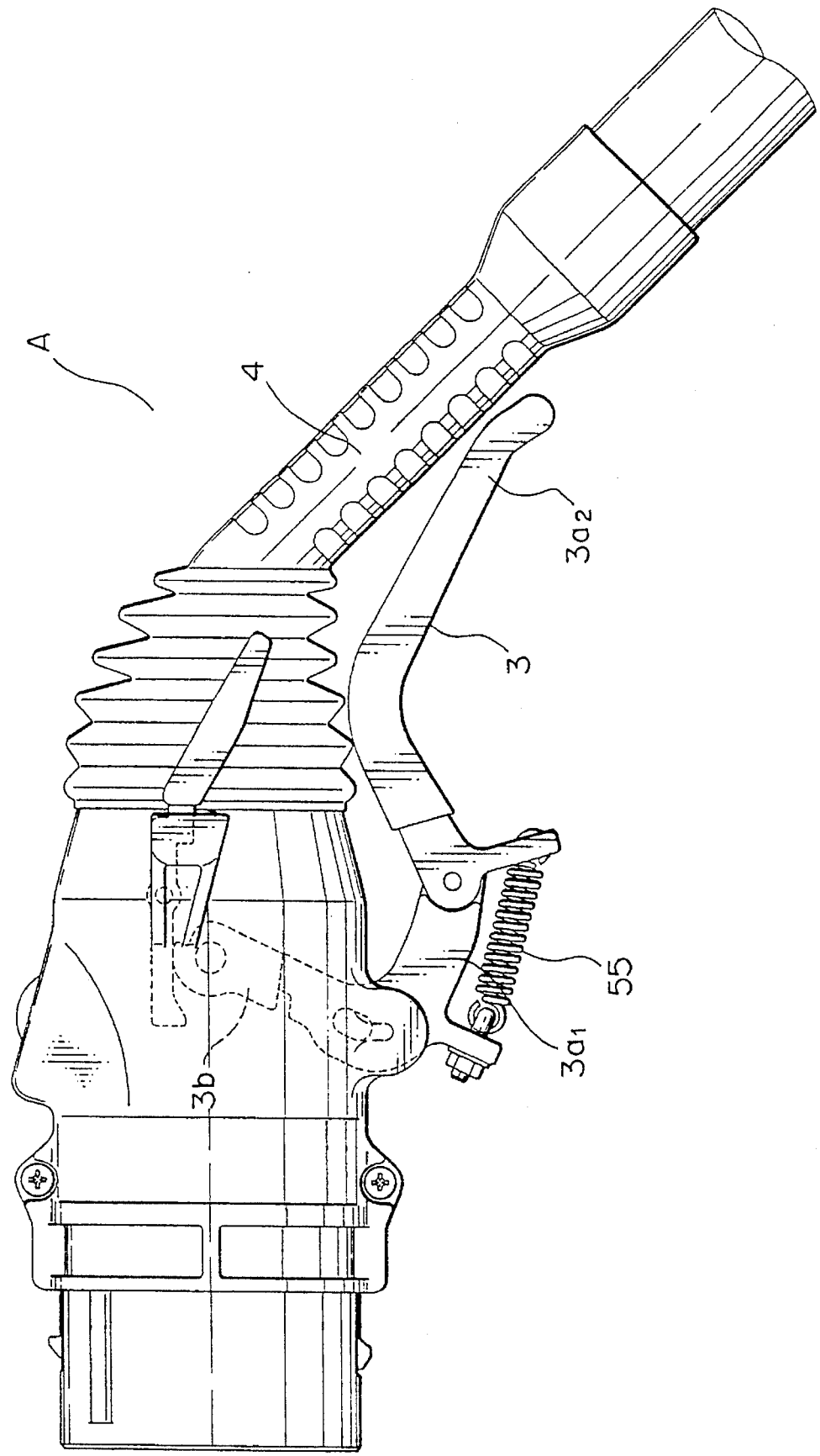
FIG. 14 illustrates the tension spring stretches when a force exceeding a predetermined value is applied to the handlebar.
Figure 15:
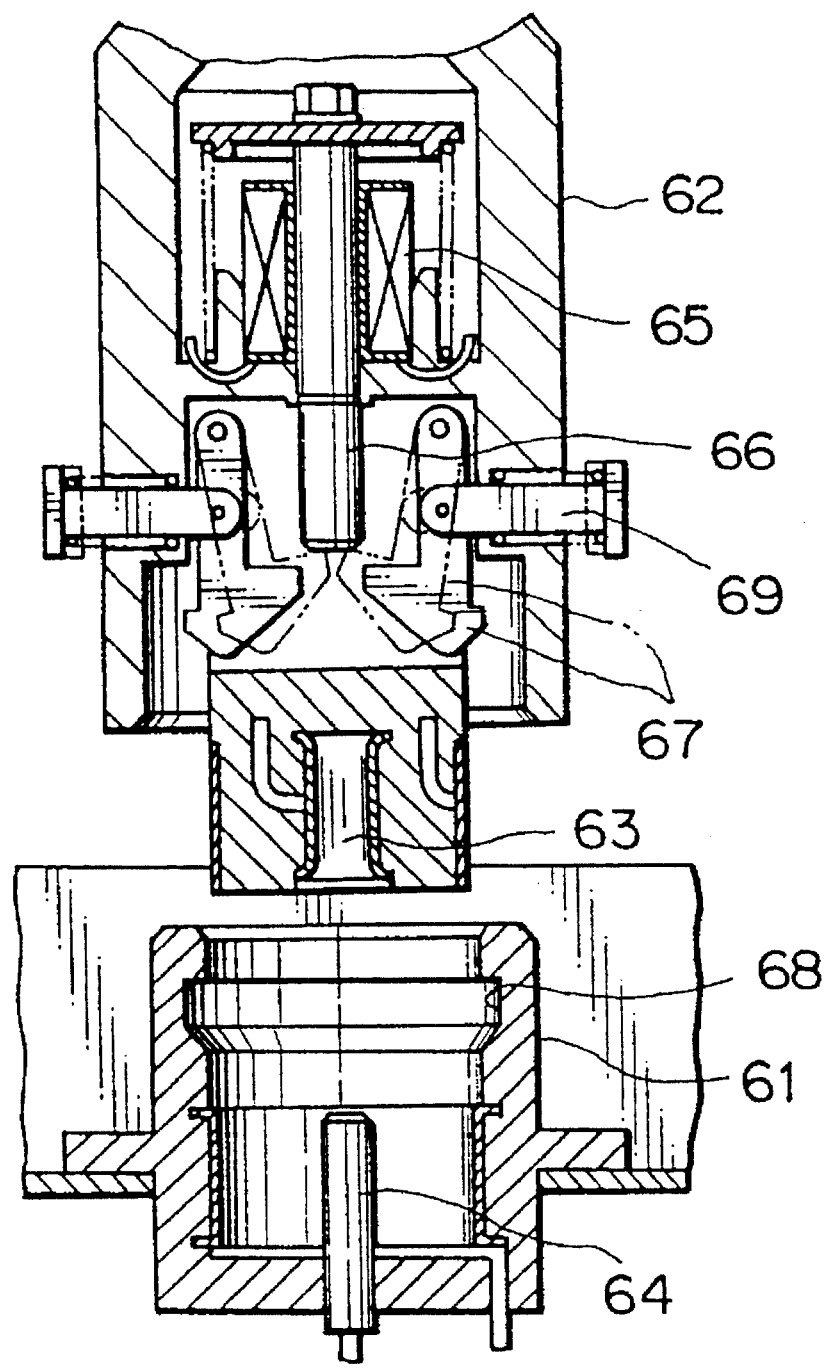
FIG. 15 illustrates a cross-sectional view of a prior art connector when a power supplying connector is disconnected from a power-receiving connector.
Figure 16:
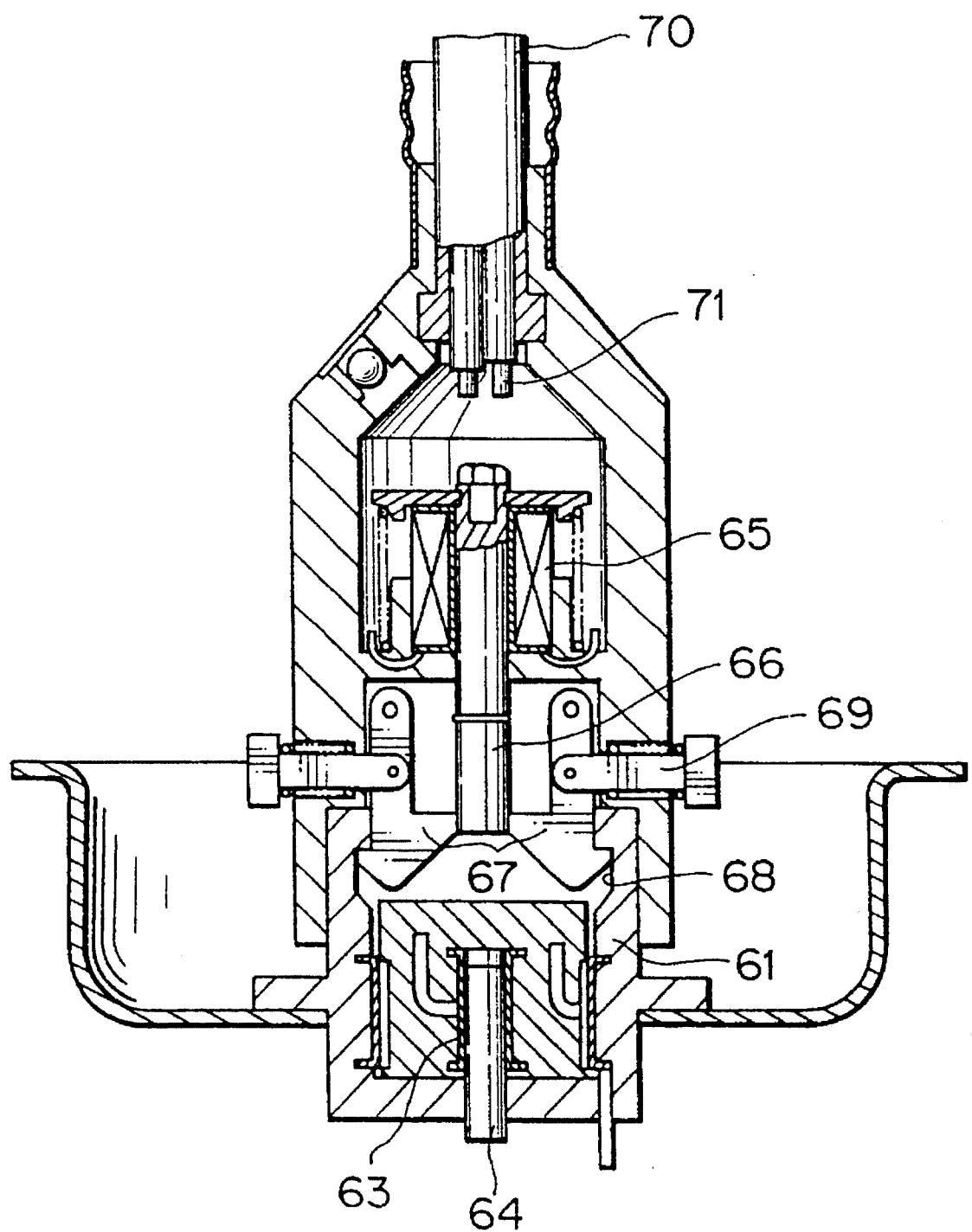
FIG. 16 illustrates a cross-sectional view of the prior art connector of FIG. 15 when the connectors are connected together.

However, when the rotation of the lever 3 is disturbed by large loads shown in FIGS. 10–13, the tension spring 55 stretches so that the hook 3a2 rotates relative to the rod 3a1 as shown in FIG. 14. Thus, a force or stress greater than a predetermined value will not be transmitted to the acting portion 3b, so that excessive loads will not act on the connector body 2 and the lever 3, preventing fractures and damages to the connectors A and B.

The invention has been described with respect to a power-supplying connector for use with electric cars, the invention may also be applied to multi-terminal connectors for conventional wire harnesses.

What is claimed is:

1. A connector comprising:

an elongated hollow case;

a connector body slidably housed in an front half of said case, and having a plurality of terminals therein;

a handle mounted to a rear half of said case, and adapted to advance and retract with said connector body longitudinally within said case;

a lever having a first portion and a second portion and journaled at an intermediate portion thereof within the case, said first portion being pivotally connected to any one of said handle and said connector body, and said second portion projecting outwardly of said case; whereby pivoting said lever about the intermediate portion journaled within the case causes said connector body to advance into a fitting engagement with a mating connector body, wherein said lever includes:

said second portion integrally continuous with said first portion;

a handlebar pivotally connected to said second portion; and a tension spring mounted between said handlebar and said second portion so that said spring yieldably stretches if a force applied to said handlebar exceeds a predetermined value when said handlebar is operated.

2. The connector according to claim 1, wherein said lever further includes an adjustment screw, said spring being mounted to the lever via said adjustment screw and adjusted a tension thererof by means of said adjusment screw.

* * * * *